United States Patent [19]
Ishiguro

[11] Patent Number: 5,956,103
[45] Date of Patent: Sep. 21, 1999

[54] ACTIVE MATRIX SUBSTRATE WITH THE DOUBLE LAYERED STRUCTURE

[75] Inventor: Kenichi Ishiguro, Tenri, Japan

[73] Assignee: Sharp Kabushiki Kaisha, Osaka, Japan

[21] Appl. No.: 08/877,520

[22] Filed: Jun. 17, 1997

[30] Foreign Application Priority Data

Jun. 19, 1996 [JP] Japan ................................. 8-158681

[51] Int. Cl.⁶ .................................................. G02F 1/1333
[52] U.S. Cl. .............................. 349/38; 349/111; 349/138
[58] Field of Search .................................... 349/111, 138, 349/42, 43, 38; 257/59, 72

[56] References Cited

U.S. PATENT DOCUMENTS

| | | | |
|---|---|---|---|
| 4,948,231 | 8/1990 | Aoki et al. ................................ | 350/334 |
| 5,412,494 | 5/1995 | Ishiwata et al. ........................... | 359/67 |
| 5,734,449 | 3/1998 | Jang ........................................ | 349/111 |
| 5,744,821 | 4/1998 | Song ....................................... | 349/111 |
| 5,777,701 | 7/1998 | Zhang ..................................... | 349/38 |
| 5,815,226 | 9/1998 | Yamazaki et al. ........................ | 349/38 |

FOREIGN PATENT DOCUMENTS

| | | |
|---|---|---|
| 63-121-886 | 5/1988 | Japan . |
| 1-33833 | 7/1989 | Japan . |
| 6-35004 | 2/1994 | Japan . |
| 7-128 685 | 5/1995 | Japan . |

*Primary Examiner*—William L. Sikes
*Assistant Examiner*—Joanne Kim
*Attorney, Agent, or Firm*—David G. Conlin; George W. Neuner

[57] ABSTRACT

An active matrix substrate including: pixel electrodes provided in a matrix; a TFT composed essentially of a semiconductor layer; a scanning signal line; a data signal line; a conductive light-shielding film formed on a substrate; a first insulating film formed on the substrate so as to cover the conductive light-shielding film; a thin semiconductor film formed on the first insulating film, the thin semiconductor film being formed of the same material as the semiconductor layer composing the TFT; a second insulating film formed on the first insulating film so as to cover the thin semiconductor film; and a storage capacitance electrode formed on the second insulating film. The storage capacitance electrode is a thin metal film formed of the same material as the scanning signal line. The storage capacitance electrode is electrically coupled to the conductive light-shielding film. A first storage capacitance is formed between the conductive light-shielding film and the thin semiconductor film. A second storage capacitance is formed between the storage capacitance electrode and the thin semiconductor film. The storage capacitance electrode at least partially overlaps the data signal line.

8 Claims, 5 Drawing Sheets

PRIOR ART

ACTIVE MATRIX SUBSTRATE WITH THE DOUBLE LAYERED STRUCTURE

BACKGROUND OF THE INVENTION

1. Field of the Invention

The present invention relates to: an active matrix substrate of a liquid crystal display device for use in the display section of a computer, a word processor, etc.; and a method for producing the same.

2. Description of the Related Art

Liquid crystal display devices including an active matrix substrate and a counter substrate with a liquid crystal layer interposed therebetween are known in the art. The active matrix substrate includes pixel electrodes provided in a matrix shape on a glass substrate, where scanning signal lines and data signal lines extend in the vicinity of the pixel electrodes so as to intersect one another. On the other hand, a counter electrode is formed on a surface of the counter substrate facing the liquid crystal layer. In a liquid crystal display device having the above configuration, potentials to be applied between the counter electrode and each pixel electrode is controlled so as to switch the orientation state of the liquid crystal molecules within each pixel region corresponding to the pixel electrode, whereby a display function is performed.

In such a liquid crystal display device, a light-shielding black matrix is typically provided on the counter substrate in order to improve the display quality of the device, the black matrix including openings having corresponding shapes to the pixel electrodes. Specifically, such a black matrix is provided to prevent light from leaking from the periphery of each pixel electrode. The black matrix is typically formed with margins to ensure that no light leaks from the periphery of each pixel electrode even if the black matrix is slightly misaligned with the counter substrate. However, the opening ratio of the liquid crystal display device decreases as the margins increase.

Moreover, in the field of liquid crystal display devices, it is commonplace to form a storage capacitance electrode in parallel to each pixel electrode for properly maintaining the potential of the pixel electrode. Since the storage capacitance electrodes must be formed in the pixel regions, they may also reduce the opening ratio of the display device.

One known type of liquid crystal display device is a projection type liquid crystal display device. There has always been a demand for reduction in size, increased definition and/or increased illuminance for this type of liquid crystal display devices. However, such demands have led to the following problems.

First, as the liquid crystal panels become smaller in size, the intensity of the light entering the liquid crystal panels is increased. The reason is that a smaller liquid crystal panel results in an increase in the ratio in size of the projected image to the liquid crystal panel (if the size of the displayed image remains the same), so that more intense light is required to display an image at the same luminance level than in the case of a larger liquid crystal panel. In general, the TFTs (thin film transistors) for controlling the state of the respective pixel electrodes are formed of thin silicon films, e.g., polycrystalline silicon. However, if light enters such a semiconductor layer, a photoelectric current is generated, thereby preventing the potentials of the pixel electrodes from being maintained at predetermined values; as a result, the display quality deteriorates. This problem becomes more prominent as the light intensity increases. In order to prevent this problem, it is necessary to form a light shielding film in each portion where a TFT is formed. However, such a light shielding film inevitably reduces the opening ratio.

Moreover, increasing the definition inevitably results in a decrease in the capacitance of each pixel electrode, thereby making it necessary to increase the physical size of the storage capacitance electrodes. However, increasing the size of the storage capacitance electrodes reduces the opening ratio.

Furthermore, in order to increase the illuminance of a liquid crystal panel, it is necessary to increase the intensity of the light entering the liquid crystal panel. This results in the need to form the above-mentioned light-shielding films, which inevitably reduce the opening ratio.

Therefore, in order to prevent a decrease in the opening ratio, it has been proposed in Japanese Laid-Open Patent Publication No.7-128685 to form a black matrix (light-shielding film) on an active matrix substrate, the black matrix being composed of a conductive light-shielding film, so that a capacitance created between the light-shielding film and each pixel electrode is utilized as a storage capacitance.

FIG. 5 is a plan view illustrating one pixel region of an active matrix substrate 200 proposed in Japanese Laid-Open Patent Publication No.7-128685. FIG. 6 is a cross-sectional view taken at line C–C' in FIG. 5. As shown in FIG. 5, the active matrix substrate 200 includes a plurality of pixel electrodes 213. Each pixel electrode 213 is formed in a region surrounded by scanning signal lines 208 and data signal lines 212 intersecting one another. A matrix of light-shielding film 202 (composed of a conductive film capable of shielding light) extends between adjoining ones of the thus-formed pixel electrodes 213 so as to partially overlap the pixel electrodes 213.

As shown in the cross-sectional view of FIG. 6, the light-shielding film 202 is provided above the data signal lines 212 and below an insulating film 214. A predetermined potential is applied to the light-shielding film 202 so that a region where the light-shielding film 202 overlaps the pixel electrode 213 via the insulating film 214 forms a storage capacitance. Moreover, a TFT 220 is formed by utilizing a portion of the scanning signal line 208 functioning as a gate electrode. The TFT 220 includes a source region 204 and a drain region provided on a transparent insulative substrate 201, the source region 204 and the drain region interposing the gate electrode.

In the above-described active matrix substrate 200, the light-shielding film 202, the data signal lines 212, and the like are essentially composed of a light-shielding material. These light-shielding films are all located above the TFT 220, which in turn is provided upon or above the transparent insulative substrate 201, so that the transparent insulative substrate 201, the TFT 220, and the light-shielding film 202 are layered in this order. However, this configuration makes the TFT 220 vulnerable to light entering through the transparent insulative substrate 201, thereby causing the above-mentioned deterioration of display quality. In addition, when the pixel pitch must be reduced in order to increase the definition of the display device, the storage capacitance must be increased for the above-mentioned reasons. However, since the storage capacitance is created by the overlapping portion between the light-shielding film and the pixel electrode, the storage capacitance can only be increased by increasing the size of the light-shielding film, thereby decreasing the opening ratio.

SUMMARY OF THE INVENTION

In one aspect of the invention, there is provided an active matrix substrate opposed by a counter substrate with a liquid crystal layer interposed therebetween, the active matrix substrate including: pixel electrodes for display purposes, provided in a matrix; a TFT provided corresponding to each pixel electrode and composed essentially of a semiconductor layer; a scanning signal line for controlling the TFT; a data signal line for supplying a data signal to the pixel electrode via the TFT, a conductive light-shielding film formed on a substrate; a first insulating film formed on the substrate so as to cover the conductive light-shielding film; a thin semiconductor film formed on the first insulating film, the thin semiconductor film being formed of the same material as a material of the semiconductor layer essentially composing the TFT; a second insulating film formed on the first insulating film so as to cover the thin semiconductor film; and a storage capacitance electrode formed on the second insulating film. The storage capacitance electrode is a thin metal film formed of the same material as a material for the scanning signal line, the storage capacitance electrode being electrically coupled to the conductive light-shielding film, a first storage capacitance being formed between the conductive light-shielding film and the thin semiconductor film, a second storage capacitance being formed between the storage capacitance electrode and the thin semiconductor film, and at least a portion of the storage capacitance electrode overlapping the data signal line.

In one embodiment of the invention, the conductive light-shielding film functions as a black matrix.

In another embodiment of the invention, the conductive light-shielding film is maintained at a predetermined potential.

In still another embodiment of the invention, the conductive light-shielding film is driven by the same voltage for driving a counter electrode formed on the counter substrate.

In still another embodiment of the invention, the conductive light-shielding film is maintained at a predetermined potential.

In still another embodiment of the invention, the conductive light-shielding film is driven by the same voltage for driving a counter electrode formed on the counter substrate.

In another aspect of the invention, there is provided a method for producing an active matrix substrate opposed by a counter substrate with a liquid crystal layer interposed therebetween, the active matrix substrate including: pixel electrodes for display purposes, provided in a matrix; a TFT provided corresponding to each pixel electrode, the TFT being composed essentially of a semiconductor layer; a scanning signal line for controlling the TFT; a data signal line for supplying a data signal to the pixel electrode via the TFT. The method includes the steps of: forming a conductive light-shielding film on a substrate; forming a first insulating film on the substrate so as to cover the conductive light-shielding film; forming a semiconductor layer on the first insulating film so as to at least partially overlap the conductive light-shielding film; forming a second insulating film on the first insulating film so as to cover the semiconductor layer; forming a contact hole through the first and second insulating films, the contact hole reaching the conductive light-shielding film; and forming and patterning a storage capacitance electrode and the scanning signal line of the same thin metal film, the storage capacitance electrode being electrically coupled to the conductive light-shielding film via the contact hole and overlapping the semiconductor layer via the second insulating film.

In one embodiment of the invention, the step of forming the conductive light-shielding film is a step of forming the conductive light-shielding film so as to define a black matrix and to include a terminal for receiving an externally-supplied electrical signal.

Thus, the invention described herein makes possible the advantages of (1) providing an active matrix substrate in which an improved light-shielding effect is provided for the TFTs and large storage capacitances are secured without sacrificing the opening ratio, the active matrix substrate being capable of displaying high quality images with high definition; and (2) providing a method for producing such an active matrix substrate.

These and other advantages of the present invention will become apparent to those skilled in the art upon reading and understanding the following detailed description with reference to the accompanying Figures.

DESCRIPTION OF THE PREFERRED EMBODIMENTS

According to the present invention, a conductive light-shielding film is coupled to a storage capacitance electrode so as to be utilized as an extension of the storage capacitance electrode. The storage capacitance electrode is formed of the same thin metal film composing scanning signal lines. A drain region of a TFT is formed between the conductive light-shielding film and the storage capacitance electrode film, where an insulating film is interposed between the conductive light-shielding film and the drain region with another insulating film being interposed between the drain region and the storage capacitance electrode film. Thus, in a cross section of the structure according to the present invention, the drain region is virtually sandwitched by two storage capacitance electrodes, i.e., one above and one below, with insulating films interposed therebetween. Such a double-layered structure of the storage capacitance according to the present invention can have an increased capacitance value per unit area as compared to the conventional single-layered structure. Alternatively, it is possible to attain the same storage capacitance with a smaller area by the double-layered structure than by the conventional single-layered structure.

Moreover, the conductive light-shielding film is formed on the active matrix substrate (as opposed to the counter substrate) so that it is unnecessary to design a black matrix with margins to compensate for misalignment. Thus, the opening ratio of the active matrix substrate can be improved.

Moreover, according to the present invention, the storage capacitance is formed below a data signal line, with an insulating film interposed therebetween. Since the storage capacitance electrode functions as an electrical shield, no capacitance coupling occurs between the data signal line and the drain region connected to the pixel electrode. Therefore, the potential of the pixel electrode is prevented from fluctuating due to the effect of the data signal waveform, whereby the display quality is prevented from deteriorating. Furthermore, since the storage capacitance is located below the data signal line, the opening ratio is not reduced.

According to the present invention, the conductive light-shielding film is interposed between the TFT and the substrate. However, a predetermined potential or waveform can be applied to the conductive light-shielding film so as not to adversely affect the driving of the liquid crystal.

Since the conductive light-shielding film is located between the TFT and the substrate, the light-shielding film protects the TFT by shielding the light entering through the substrate. As a result, the display quality is prevented from deteriorating due to the generation of a photoelectric current in the TFT.

Hereinafter, an example of the present invention will be described with reference to FIGS. 1 to 3.

Figure 1:
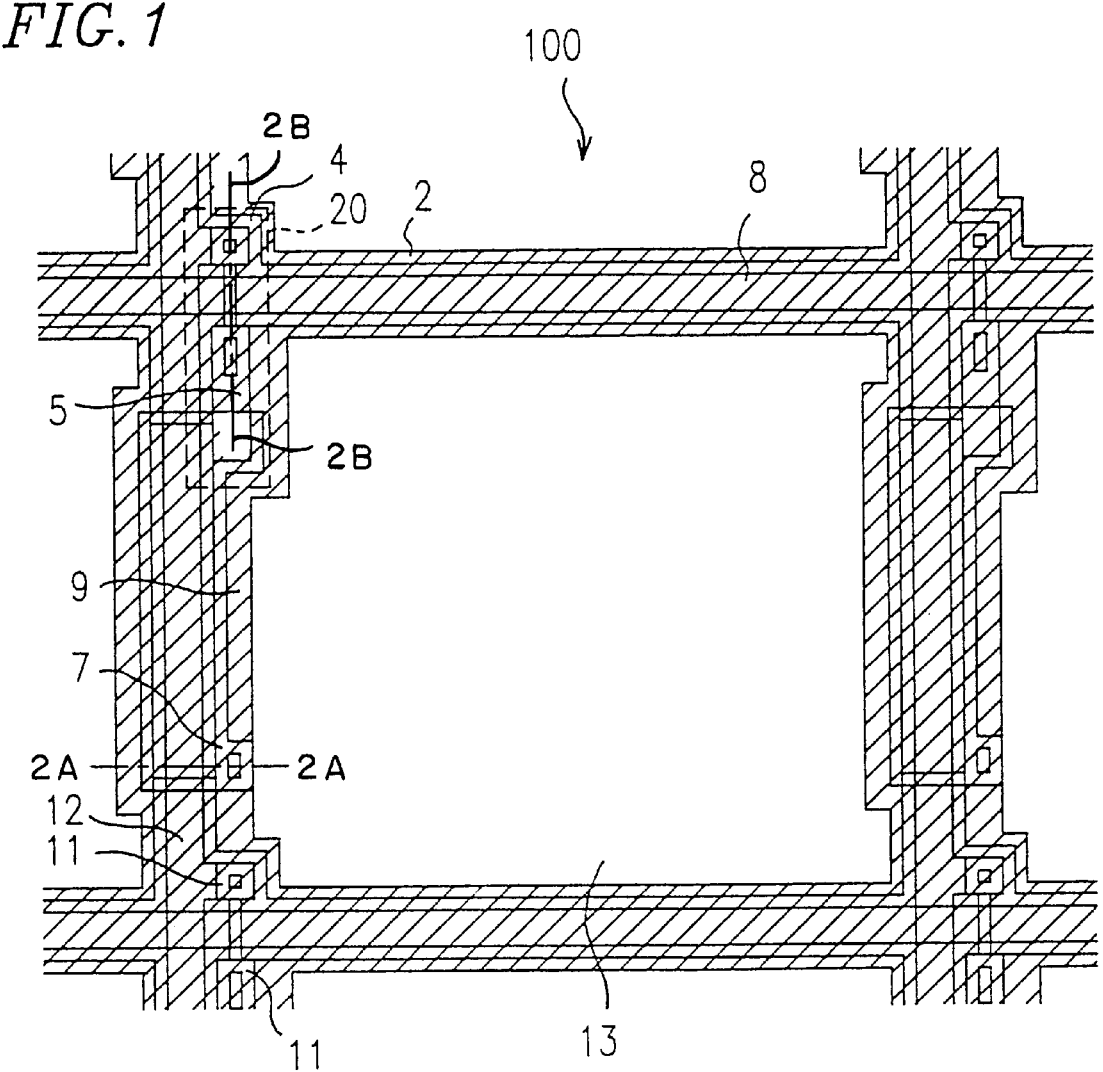
FIG. 1 is a partially enlarged plan view showing an active matrix substrate according to an example of the present invention.
Figure 2A:
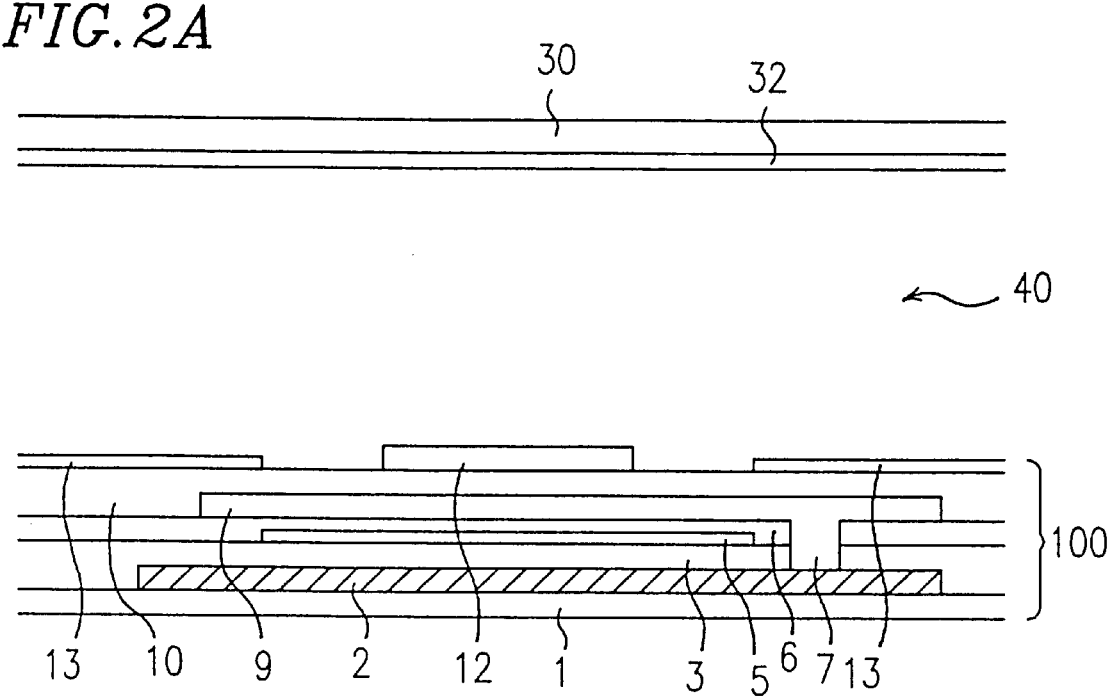
FIG. 2A is a cross-sectional view taken at line 2A–2A' in FIG. 1.
Figure 2B:
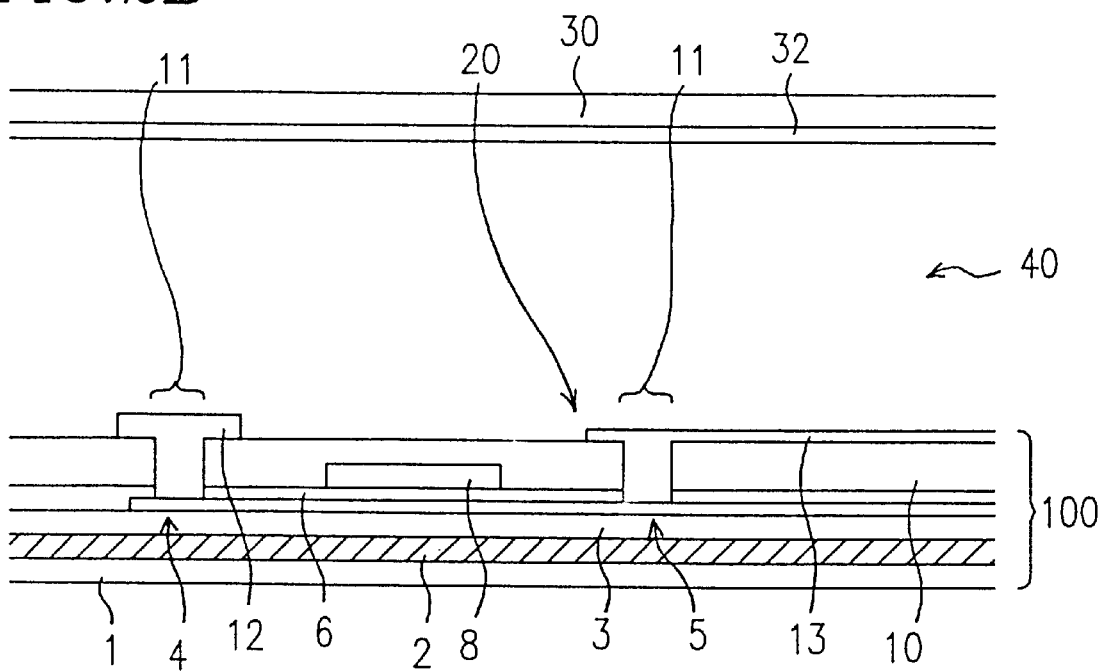
FIG. 2B is a cross-sectional view taken at line 2B–2B' in FIG. 1.
Figure 3A:
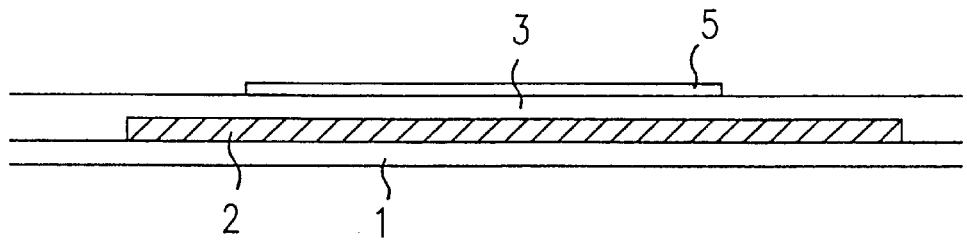
FIGS. 3A to 3C are cross-sectional view taken at line 2A–2A' in FIG. 1 illustrating the production steps of the active matrix substrate.
Figure 3B:
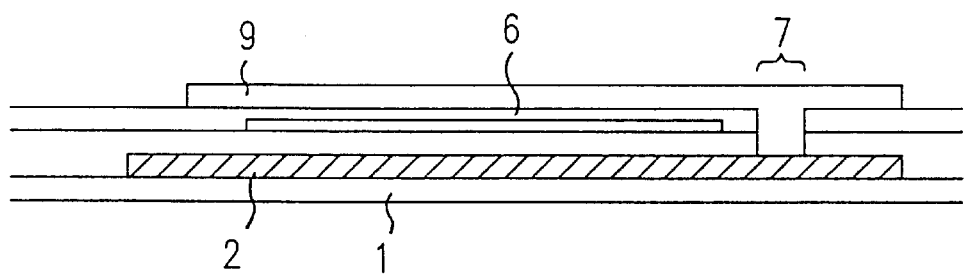
Figure 3C:
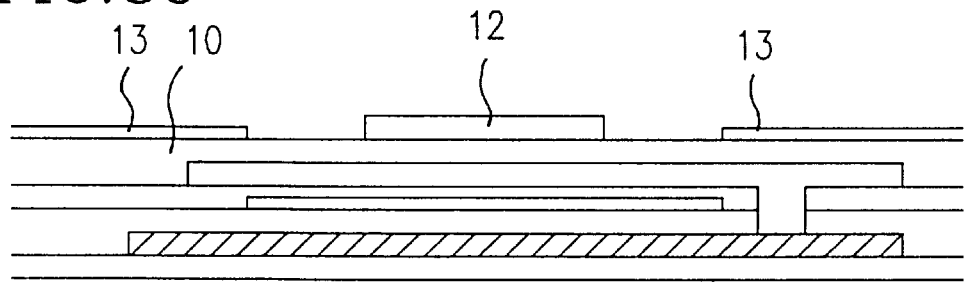

FIG. 1 is an enlarged plan view showing a portion of an active matrix substrate 100 according to the present example. FIG. 2A is a cross-sectional view taken at line A–A' showing an exemplary liquid crystal display device incorporating the active matrix substrate 100 of FIG. 1. FIG. 2B is a cross-sectional view taken at line B–B' showing the liquid crystal display device incorporating the active matrix substrate 100 of FIG. 1. FIGS. 3A to 3C are views showing the production steps of the active matrix substrate 100 taken at line A–A' in FIG. 1.

The liquid crystal display device shown in FIGS. 2A and 2B includes a counter substrate 30 and a liquid crystal layer 40 as well as the active matrix substrate 100. The active matrix substrate 100 and the counter substrate 30 oppose each other so as to interpose the liquid crystal layer 40 therebetween as a display medium. As the liquid crystal layer 40, a combination of a liquid crystal and a polymer material or a liquid crystal alone can be used, for example. The counter substrate 30 includes a counter electrode 32 formed on one of its surfaces that faces the liquid crystal layer 40. As will be appreciated by those skilled in the art, a complete liquid crystal display device would additionally include polarizing plates or a combination of phase difference plates provided on both sides of this liquid crystal panel.

Next, the structure of the active matrix substrate 100 will be further described with reference to the plain view of FIG. 1.

The active matrix substrate 100 includes a plurality of display pixel electrodes 13 provided in a matrix shape. Each pixel electrode 13 is formed in a region surrounded by scanning signal lines 8 and data signal lines 12 intersecting one another. A matrix of conductive light-shielding film 2 (composed of a conductive film capable of shielding light) extends between adjoining ones of the pixel electrodes 13 so as to partially overlap the pixel electrodes 13. Specifically, the conductive light-shielding film 2 is formed so as to surround each pixel electrode 13 in the matrix shape.

Moreover, a TFT 20 is formed by utilizing a portion of the scanning signal line 8 as a gate electrode. The TFT 20 includes a source region 4 and a drain region 5 interposing the gate electrode. The TFT 20 controls the application of signals to the pixel electrode 13. The scanning signal lines 8 sequentially turn on or off the TFTs 20 in the matrix. The data signal lines 12 are used for supplying data signals to the pixel electrodes 13 via the TFTs 20.

Now, the active matrix substrate 100 will be discussed in more detail, following the order of production thereof.

As shown in FIG. 3A, the light-shielding film 2 composed essentially of a Ta film (having a thickness of about 50 nm to about 300 nm; preferably 150 nm) is formed on the transparent insulative substrate 1. The light-shielding film 2 is patterned into a predetermined shape, as exemplified in the plan view of FIG. 1.

Next, an $SiO_2$ film (having a thickness of about 100 nm to about 500 nm, and preferably about 300 nm), which becomes an insulating film 3, is formed so as to cover the conductive light-shielding film 2 over substantially the entire surface of the substrate 1.

Thereafter, a thin polycrystalline silicon film (having a thickness of about 10 nm to about 100 nm; preferably about 50 nm) is formed. After a resist having portions to cover a channel region of each TFT 20 is formed, the silicon film is doped with a high-concentration impurity, e.g., phosphorus, to form the source region 4 (FIG. 2B) and the drain region 5. The drain region 5 also functions as a storage capacitance electrode. As seen from FIG. 2B, the TFT 20 is defined essentially by the source region 4, the drain region 5, and a portion of the scanning signal line 8 functioning as a gate electrode. To the conductive light-shielding film 2, it is preferable to apply a constant potential that is within a voltage range which keeps the TFT 20 off, or the same driving waveform as that applied to the counter electrode 32 provided on the counter substrate 30.

Next, as shown in FIG. 3B, an $SiO_2$ film (having a thickness of about 50 nm to about 300 nm; preferably about 100 nm), which becomes a gate insulating film 6, is formed. A contact hole 7 is formed in the $SiO_2$ gate insulating film 6.

Next, the scanning signal line 8 (not shown) and a storage capacitance electrode 9 composed essentially of a thin Al alloy film (having a thickness of about 100 nm to about 500 nm; preferably about 300 nm) are formed on the active matrix substrate in the state shown in FIG. 3B. Thus, the scanning signal line 8 and the storage capacitance electrode 9 can be produced in a single step, thereby facilitating production. As described above, the TFT 20 is defined essentially by a portion of the scanning signal line 8 functioning as a gate electrode, the source region 4 (FIG. 2B), and the drain region 5. At this time, the conductive light-shielding film 2 and the storage capacitance electrode 9 are electrically connected to each other via the contact hole 7. Thus, a double-layered storage capacitance is created through this connection, which makes it possible to obtain a large capacitance from a relatively small area. In order to avoid defects due to pinholes, it is preferable to form an oxide film on the surface of the scanning signal line 8 and the storage capacitance electrode 9 by anodic oxidation or thermal oxidation, etc.

Next, as shown in FIG. 3C, an $SiO_2$ film (having a thickness of about 100 nm to about 1 $\mu$m; preferably about 400 nm), which becomes an insulating film 10, is formed. A contact hole 11 is formed in the $SiO_2$ gate insulating film 10.

Next, the data signal line 12 is formed of a thin Al alloy film (having a thickness of about 300 nm to about 800 nm; preferably about 500 nm). The pixel electrode 13 is formed of a transparent conductive film (having a thickness of about 300 nm to about 800 nm; preferably about 500 nm), e.g., an ITO (indium tin oxide) film. It will be seen from FIG. 3C that the data signal line 12 overlaps the drain region 5 with the storage capacitance electrode 9 interposed therebetween. This configuration makes it possible to utilize the storage capacitance electrode 9 as an electrical shield for eliminating a source-drain capacitance, thereby eliminating fluctuation in the potential of the pixel electrode 13 due to the influence of the data signal, which would otherwise cause deterioration in the display quality.

In the active matrix substrate 100 thus produced, the conductive light-shielding film 2 is interposed between the TFT 20 and the substrate 1. However, a predetermined potential or waveform is applied to the conductive light-shielding film 2 so as not to adversely affect the driving of the liquid crystal.

The storage capacitance electrode 9, which is formed of the same thin film as the thin metal film composing the scanning signal line 8, is coupled to the conductive light-shielding film 2. The drain region 5 of the TFT 20 is formed between the storage capacitance electrode 9 and the conductive light-shielding film 2, with the insulating films 3 and 6 interposed therebetween. The conductive light-shielding film 2 is utilized as an extension of the storage capacitance electrode 9. Specifically, this structure can be regarded as including upper and lower storage capacitance electrodes above and below the drain region 5 (with the insulating films 3 and 6 interposed therebetween). Thus, a double-layered storage capacitance is created through this connection, which makes it possible to obtain a larger capacitance per unit area than in the case of a single-layered storage capacitance construction.

For example, under the conditions that the insulating film 3 below the drain region 5 is an $SiO_2$ film having a thickness of 300 nm and that the insulating film 6 above the drain region 5 is an $SiO_2$ film having a thickness of 100 nm, the storage capacitance per unit area increases by 33% as compared with the storage capacitance obtained by utilizing only the insulating film 6 above the drain region 5. Alternatively, the same storage capacitance can be attained by the double-layered structure with an area which is 25% smaller than that required for a single-layered structure.

Although a double-layered structure was described, it is also possible to create a storage capacitance between an end portion of the conductive light-shielding film 2 and an end portion of the pixel electrode 13. However, the storage capacitance in this area should not be excessively increased because it would substantially decrease the opening ratio of the display device.

Moreover, the data signal line 12 is formed above the storage capacitance with the insulating film 10 interposed therebetween. Since the storage capacitance electrode 9 functions as an electrical shield, no capacitance coupling occurs between the drain region 5 connected to the pixel electrode 13 and the data signal line 12. Therefore, the potential of the pixel electrode 13 is prevented from fluctuating due to the effect of the data signal waveform, whereby the display quality is prevented from deterioration. Furthermore, since the storage capacitance is located below the data signal line 12, the opening ratio is not reduced.

Figure 4:
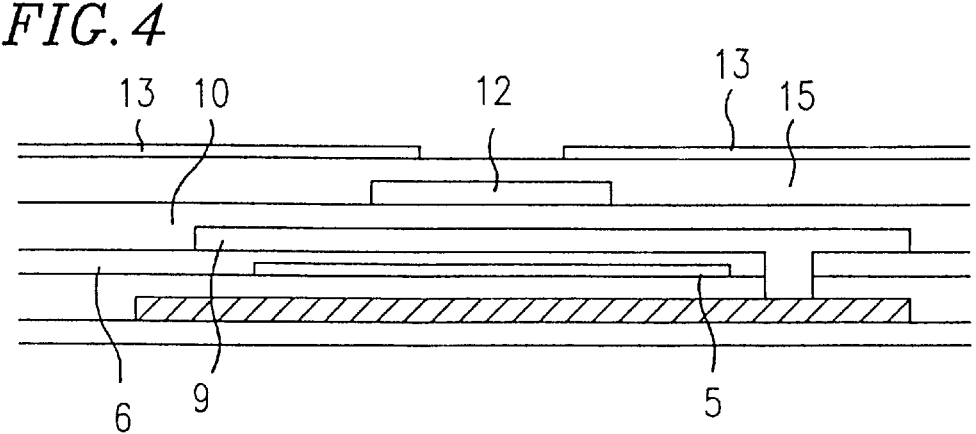
FIG. 4 is a cross-sectional view showing another exemplary configuration of the active matrix substrate according to the present invention.
Figure 5:
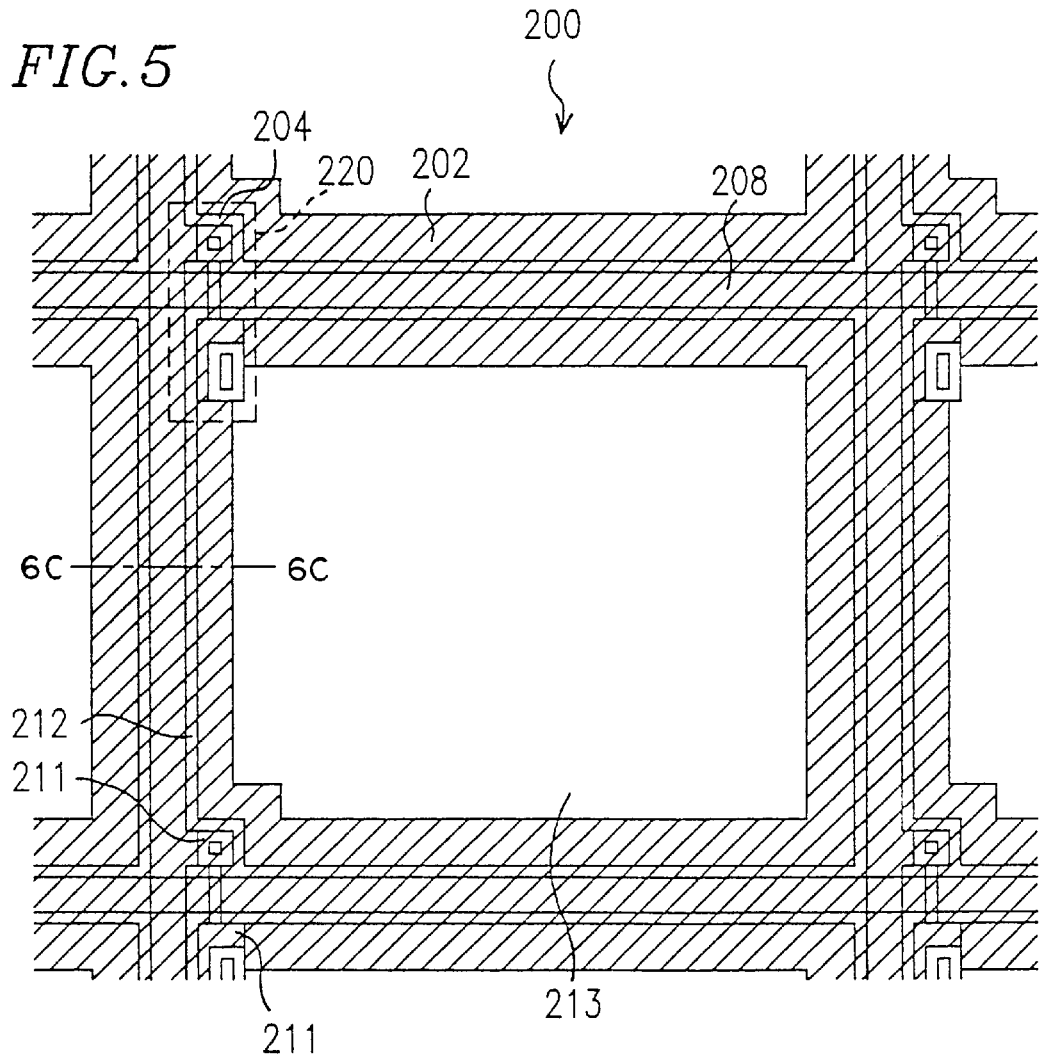
FIG. 5 is a partially enlarged view showing one pixel region of an active matrix substrate of a liquid crystal display device as proposed in the prior art.
Figure 6:
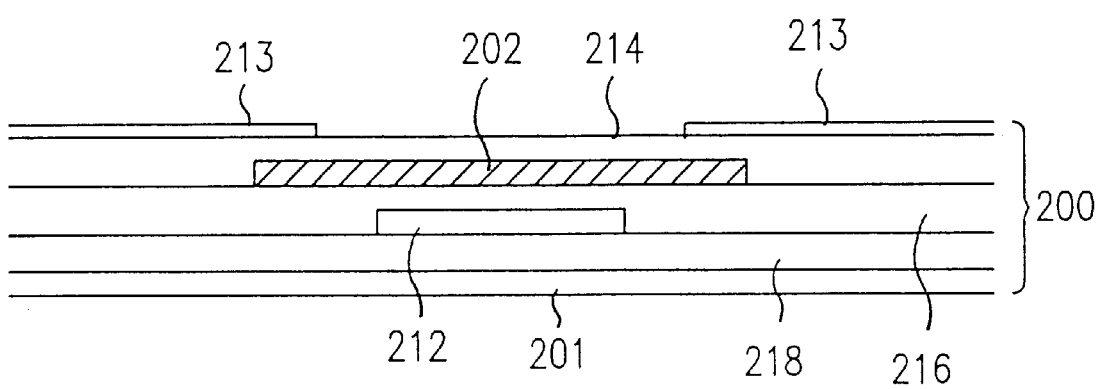
FIG. 6 is a cross-sectional view taken at line 6C–6C' in FIG. 5.

It is also applicable in the present invention to perform the step shown in FIG. 3C in the manner shown in FIG. 4. That is, an $SiO_2$ film (having a thickness of about 500 nm to about 1.5 µm; preferably about 1 µm), which becomes an insulating film 15, can be formed after forming the data signal line 12, and a contact hole for interconnecting the drain region 5 and the pixel electrode 13 can be formed before forming the pixel electrode 13. As a result, the area of the pixel electrode 13 can be increased.

It will be appreciated that, for the sake of improving the production yield and/or efficiency, other materials and film thickness may be used for the thin metal films and insulating films in the active matrix substrate 100 according to the present example.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An active matrix substrate opposed by a counter substrate with a liquid crystal layer interposed therebetween, the active matrix substrate comprising:
   a substrate;
   a plurality of pixel electrodes for display purposes, provided in a matrix on the substrate;
   a TFT provided corresponding to each of the pixel electrodes and including a semiconductor layer;
   a scanning signal line for controlling the TFT; and
   a data signal line for supplying a data signal to each of the pixel electrodes via the TFT,
   the active matrix substrate further comprising;
   a conductive light-shielding film formed on the substrate;
   a first insulating film formed on the substrate so as to cover the conductive light-shielding film;
   a thin semiconductor film formed on the first insulating film, the thin semiconductor film being formed of the same material as a material of the semiconductor layer included in the TFT;
   a second insulating film formed on the first insulating film so as to cover the thin semiconductor film; and
   a storage capacitance electrode formed on the second insulating film,
   wherein the storage capacitance electrode is a thin metal film formed of the same material as a material for the scanning signal line, the storage capacitance electrode being electrically coupled to the conductive light-shielding film,
   a first storage capacitance being formed between conductive light-shielding film and the thin semiconductor film, and
   a second storage capacitance being formed between the storage capacitance electrode and the thin semiconductor film, and
   at least a portion of the storage capacitance electrode overlapping the data signal line.

2. An active matrix substrate according to claim 1, wherein the conductive light-shielding film functions as a black matrix.

3. An active matrix substrate according to claim 2, wherein the conductive light-shielding film is maintained at a constant potential.

4. An active matrix substrate according to claim 2, wherein the conductive light-shielding film is driven by the same voltage for driving a counter electrode formed on the counter substrate.

5. An active matrix substrate according to claim 1, wherein the conductive light-shielding film is maintained at a constant potential.

6. An active matrix substrate according to claim 1, wherein the conductive light-shielding film is driven by the same voltage for driving a counter electrode formed on the counter substrate.

7. A method for producing an active matrix substrate opposed by a counter substrate with a liquid crystal layer interposed therebetween, the active matrix substrate comprising: a substrate; a plurality of pixel electrodes for display purposes, provided in a matrix on the substrate; a TFT provided corresponding to each of the pixel electrodes, the TFT having a semiconductor layer; a scanning signal line for controlling the TFT; a data signal line for supplying a data signal to each of the pixel electrodes via the TFT, the method comprising the steps of:

forming a conductive light-shielding film on the substrate;

forming a first insulating film on the substrate so as to cover the conductive light-shielding film;

forming the semiconductor layer on the first insulating film so as to at least partially overlap the conductive light-shielding film;

forming a second insulating film on the first insulating film so as to cover the semiconductor layer;

forming a contact hole through the first and second insulating films, the contact hole reaching the conductive light-shielding film; and forming and patterning a storage capacitance electrode and the scanning signal line of the same thin metal film, the storage capacitance electrode being electrically coupled to the conductive light-shielding film via the contact hole and overlapping the semiconductor layer via the second insulating film.

8. A method according to claim 7, wherein the step of forming the conductive light-shielding film is a step of forming the conductive light-shielding film so as to define a black matrix and to include a terminal for receiving an externally-supplied electrical signal.

* * * * *